United States Patent
Neuhaus

(10) Patent No.: US 7,113,770 B2
(45) Date of Patent: Sep. 26, 2006

(54) METHOD AND DEVICE FOR FORMING GROUPS FROM SUBSCRIBERS TO A COMMUNICATION NETWORK

(75) Inventor: Ralf Neuhaus, Lünen (DE)

(73) Assignee: Siemens Aktiengesellschaft, Munich (DE)

( * ) Notice: Subject to any disclaimer, the term of this patent is extended or adjusted under 35 U.S.C. 154(b) by 287 days.

(21) Appl. No.: 10/494,551

(22) PCT Filed: Oct. 15, 2002

(86) PCT No.: PCT/DE02/03900

§ 371 (c)(1),
(2), (4) Date: Apr. 30, 2004

(87) PCT Pub. No.: WO03/041375

PCT Pub. Date: May 15, 2003

(65) Prior Publication Data

US 2004/0247104 A1    Dec. 9, 2004

(30) Foreign Application Priority Data

Oct. 31, 2001   (DE) ............................ 101 53 255

(51) Int. Cl.
*H04M 3/42* (2006.01)

(52) U.S. Cl. ............... 455/414; 455/416; 455/433; 455/518; 455/519

(58) Field of Classification Search ............... None
See application file for complete search history.

(56) References Cited

U.S. PATENT DOCUMENTS

| | | | |
|---|---|---|---|
| 5,920,619 A | | 7/1999 | Karppinen |
| 6,097,942 A | * | 8/2000 | Laiho ................. 455/414.1 |
| 6,097,963 A | * | 8/2000 | Boltz et al. ............. 455/518 |
| 2005/0100155 A1 | * | 5/2005 | Trinkel et al. ......... 379/220.01 |

OTHER PUBLICATIONS

IBM Corp., "Simplified Interface For PABX Configuration", IBM Technical Disclosure Bulletin, IBM Corp., New York, US, vol. 35, No. 2, Jul. 1, 1992, pp. 474-478, XP 000313365, ISSN: 0018-8689.

* cited by examiner

*Primary Examiner*—Creighton Smith

(57) ABSTRACT

The invention relates to a service that forms groups from subscribers to a communication network by means of data sets allocated to the subscribers which are available within the communication network. The identifications of the subscribers are filed in fields of the data sets. The service automatically checks selected fields of the data sets for identical identifications and automatically groups those subscribers that have identical identifications in the selected fields.

15 Claims, 3 Drawing Sheets

METHOD AND DEVICE FOR FORMING GROUPS FROM SUBSCRIBERS TO A COMMUNICATION NETWORK

CROSS REFERENCE TO RELATED APPLICATIONS

This application is the US National Stage of International Application No. PCT/DE02/03900, filed Oct. 15, 2002 and claims the benefit thereof. The International Application claims the benefits of German application No. 10153255.5 filed Oct. 31, 2001, both of the applications are incorporated by reference herein in their entirety.

FIELD OF INVENTION

The invention relates to a method and an apparatus for forming groups of subscribers in a communication network in accordance with the precharacterizing part of claims 1 and 16.

BACKGROUND OF INVENTION

Modern communication networks made up of communication systems comprise central or distributed databases in which the subscribers connected to the communication networks have been recorded. For each subscriber, the databases contain a data record in which the subscriber-specific information has been stored in fields, that is to say at specific positions in the data record. The fields may also be referred to as elements of the data records.

In telecommunication systems, often also referred to as telecommunication installations, this information comprises at least the telephone number of the subscriber, in addition to the statement indicating the physical access unit, the "location". In addition, it regularly also includes further identifiers, for example the name of the subscriber, his department name, statements about his authorization to make outside and international calls and the like. In this case, the subscribers in telecommunication networks, which are formed from at least one telecommunication system, are often associated with groups. Each subscriber may be a member of one group or else of a plurality of groups. One known example is the call acceptance group, in which incoming calls which are not answered by the called subscriber within a predetermined time can be taken by the other members of this group. A similar example is the multiaddress call service feature, in which a workgroup is additionally assigned a group telephone number which, when dialed, involves the call being routed to all of the telephones of the group members and thus being able to be taken by any group member. The subscribers in a boss/secretary relationship, where incoming calls for the boss are also signaled on the secretary's telephone, are also a small group. Finally, the "closed user group", in which only calls within this group can be connected, is also a group in the aforementioned sense.

The association with one or more groups is set in the telecommunication systems to which the subscribers are connected. This is usually also recorded in the data records.

The printed document U.S. Pat. No. 5,920,619 "Regional Centrex" shows a method, called "Regional Centrex", in which closed user groups are formed in a public communication network having a plurality of communication installations and beyond the boundaries of a single communication installation. To this end, each of the communication installations connected to the method manages a database ("Centrex File") which lists all those local users for whom the Centrex method is intended to apply and who are registered on the respective local communication installation in question. The respective local databases in the individual communication installations are managed from a central site using commands ("Operation and Maintenance Command"). In this case, various commands for creating a data record, erasing a data record, creating a group, removing a group etc. are provided.

The group association in communication systems which are in the form of e-mail systems for interchanging electronic mail has special features. In the e-mail systems, data records containing the identifiers relating to the subscribers may likewise be stored in a database. These data records then also have various fields, at least one of which contains the subscriber's e-mail address. Further fields in the data records may contain, by way of example, the subscriber's name, an organization unit, a site or building information item, the telephone number and fax number and the like. In the e-mail systems too, subscribers can be combined to produce groups. One known example of this is "distribution lists", where the addressee specified for sending a message is the name of a list, and each subscriber recorded in this list receives a copy of this message. A subscriber's association with such a list can be recorded in the data record, or alternatively there may be a separate list in which the subscribers to be addressed using this list are recorded. The group association in e-mail systems thus does not imperatively need to be noted in the data records, but rather is frequently stored in a separate list in which all of the subscribers to be addressed using this list are recorded.

In communication systems and communication networks, particularly those having a large number of subscribers and/or a number of subscribers which changes frequently over time, it has been found to be disadvantageous that the grouping of subscribers entails a high level of complexity which regularly needs to be achieved manually. In communication networks, which comprise a plurality of communication systems, it is frequently necessary to alter a large number of data records or lists in what is often a plurality of databases in order to create or change group relationships.

SUMMARY OF INVENTION

The object of the invention is to propose a method and an apparatus which simplifies the setup and maintenance of groupings in communication systems and communication networks.

This object is achieved for the method by the features specified in claim 1 and for the apparatus by the features specified in claim 16. The characterizing features of the subclaims advantageously refine the method further.

For the method and the apparatus, the solution makes provision for selected fields in the data records to be automatically checked for the same identifiers by means of a service and for the respective subscribers who have the same identifiers in the selected fields to be automatically combined to produce a group and, when a data record is changed, for the association between the associated subscriber and one or more groups to be automatically rechecked and a fresh association made if appropriate.

Particularly if the communication network is formed from a plurality of communication systems having a large number of subscribers, it is always possible to form up-to-date groups.

Access to the data records for individual subscribers is simplified if the data records are stored in a database.

It is possible to dispense with changing data records manually if the association between subscribers and groups is automatically updated in the database.

The administration of telecommunication networks is simplified if when a data record is changed the association between the associated subscriber and one or more groups is automatically rechecked and a fresh association is made if appropriate.

If the data records are created at least when the subscribers register for the first time, there is no need for manual data maintenance for a fresh or further grouping of the subscribers.

For reasons of cost control and information security, it is advantageous if the subscribers who have been combined to produce a group form a closed user group.

Vain attempts at contacting subscribers can be avoided by virtue of subscribers who are temporarily unavailable being automatically removed from the group or groups for this time and being automatically added to the group or groups again when availability has returned.

The addressing of groups instead of individual subscribers is effective particularly if the subscribers who have been combined to produce a group have at least one common identifier in at least one field in the associated data records.

The complexity of setting up a new subscriber in a communication network is reduced if the registration of the subscriber on the communication network for the purpose of creating the associated data record involves the identifiers for individual or all fields in the data record being interrogated from a central database and being stored in the fields, and the subscriber being automatically associated with groups on the basis of these identifiers.

If the communication network is a packet-switched network (IP network; IP=Internet Protocol), or if such a network is used at least for the interchange of data, it is a simple matter to implement access to the data records in the database or databases using ordinary data processing installations.

The availability of work groups by telephone is improved if the communication network is a telecommunication network and the group or groups can be used at least as a call acceptance group or in order to implement a group call.

It is a simple matter to send e-mails to a large number of subscribers if the communication network is a network for interchanging electronic mail and the group or groups are used at least as a distribution list for electronic mail.

BRIEF DESCRIPTION OF THE DRAWINGS

An exemplary embodiment of the invention is described below with reference to the drawing, in which.

DETAILED DESCRIPTION OF INVENTION

Figure 1:
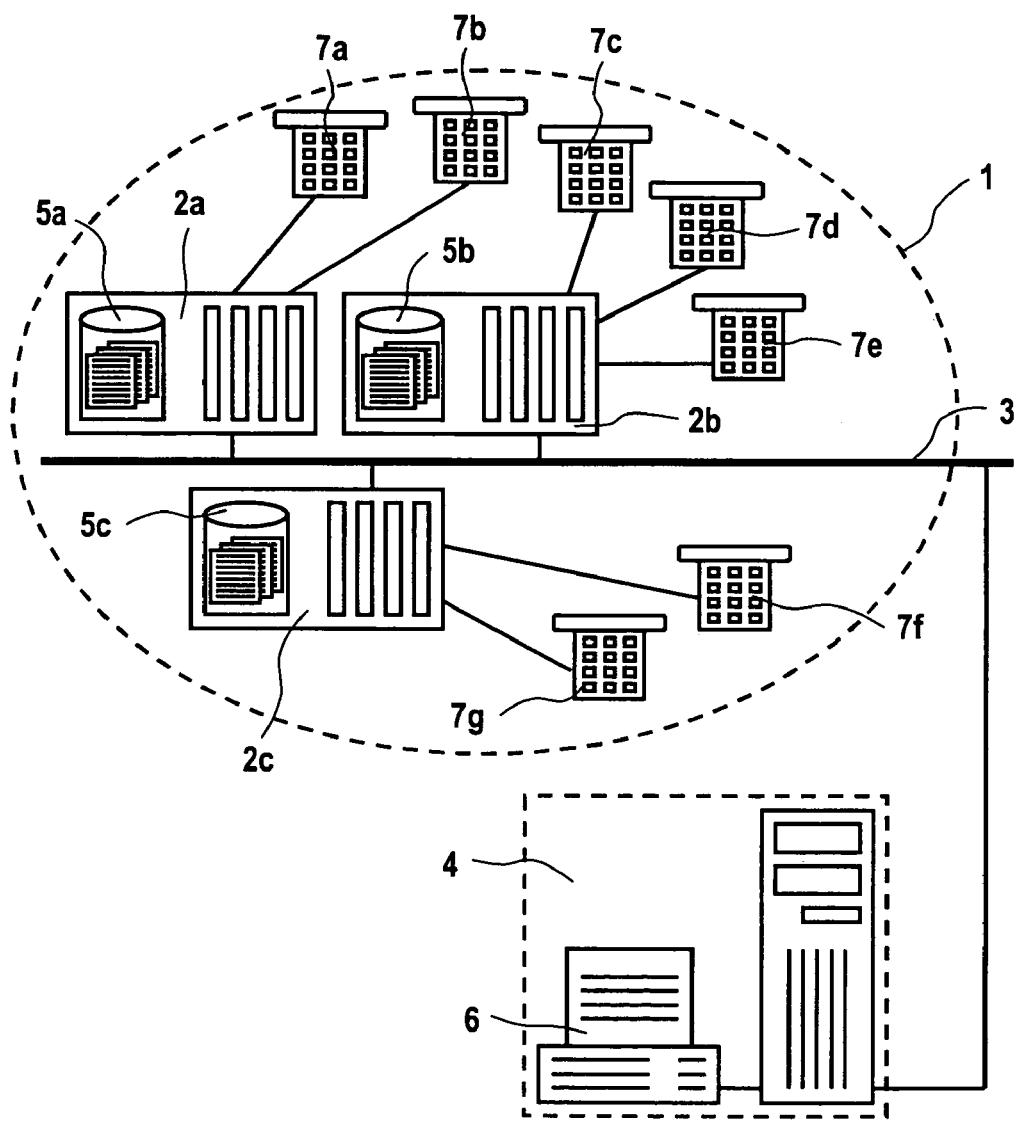
FIG. 1 shows group formation in a telecommunication network.

The telecommunication network 1 schematically shown in FIG. 1 comprises a plurality of telecommunication systems 2a, 2b, 2c, as network nodes with subscribers 7a–7g connected thereto. The telecommunication systems 2a, 2b, 2c are connected to a central computer 4 by means of a packet-switched network (IP network) 3. Applications which are installed on the central computer 4 have access to the telecommunication systems 2a, 2b, 2c for the purpose of administration over the packet-switched network 3. The administration functions include accessing the subscriber-specific data or data records which are stored in the databases 5a, 5b, 5c in the telecommunication systems 2a, 2b, 2c and setting up and changing group relationships between the individual subscribers 7a–7g.

Installed on the central computer 4 is a service 6 which, from this central point, combines the subscribers 7a–7g who belong to the same departments in a company to produce a respective call acceptance group. In this case, a prerequisite for the grouping to proceed automatically is that the subscriber-specific data which are stored in the databases 5a, 5b, 5c in the telecommunication systems 2a, 2b, 2c contain a field or element with the department name for the respective subscriber 7a–7g.

To group the subscribers 7a–7g, the service 6 sets up a connection to each of the telecommunication systems 2a, 2b, 2c via the IP network 3 in a first step and interrogates from each database 5a, 5b, 5c in each telecommunication system 2a, 2b, 2c the list containing the subscriber-specific data records for all the subscribers 7a–7g. From these data records, the central service 6 evaluates the field containing the department names, creates a list of all the departments therefrom and presents this list to a service user for selection. In a second step, the service user selects from this list that department or those departments whose subscribers 7a–7g need to be combined to produce a respective call acceptance group. In a third step, the service 6 again uses the IP network 3 to set up connections to each of the telecommunication systems 2a, 2b, 2c to which subscribers 7a–7g who are intended to be combined to produce call acceptance groups are connected. For the purpose of configuration in the telecommunication systems 2a, 2b, 2c, the service 6 calls the respective functions which are used for setting up call acceptance groups. These are the same functions as are also used by programs for manual configuration, the "administration tools". The service 6 uses these functions for automatically setting up the desired call acceptance groups in the telecommunication systems 2a, 2b, 2c.

Figure 2:
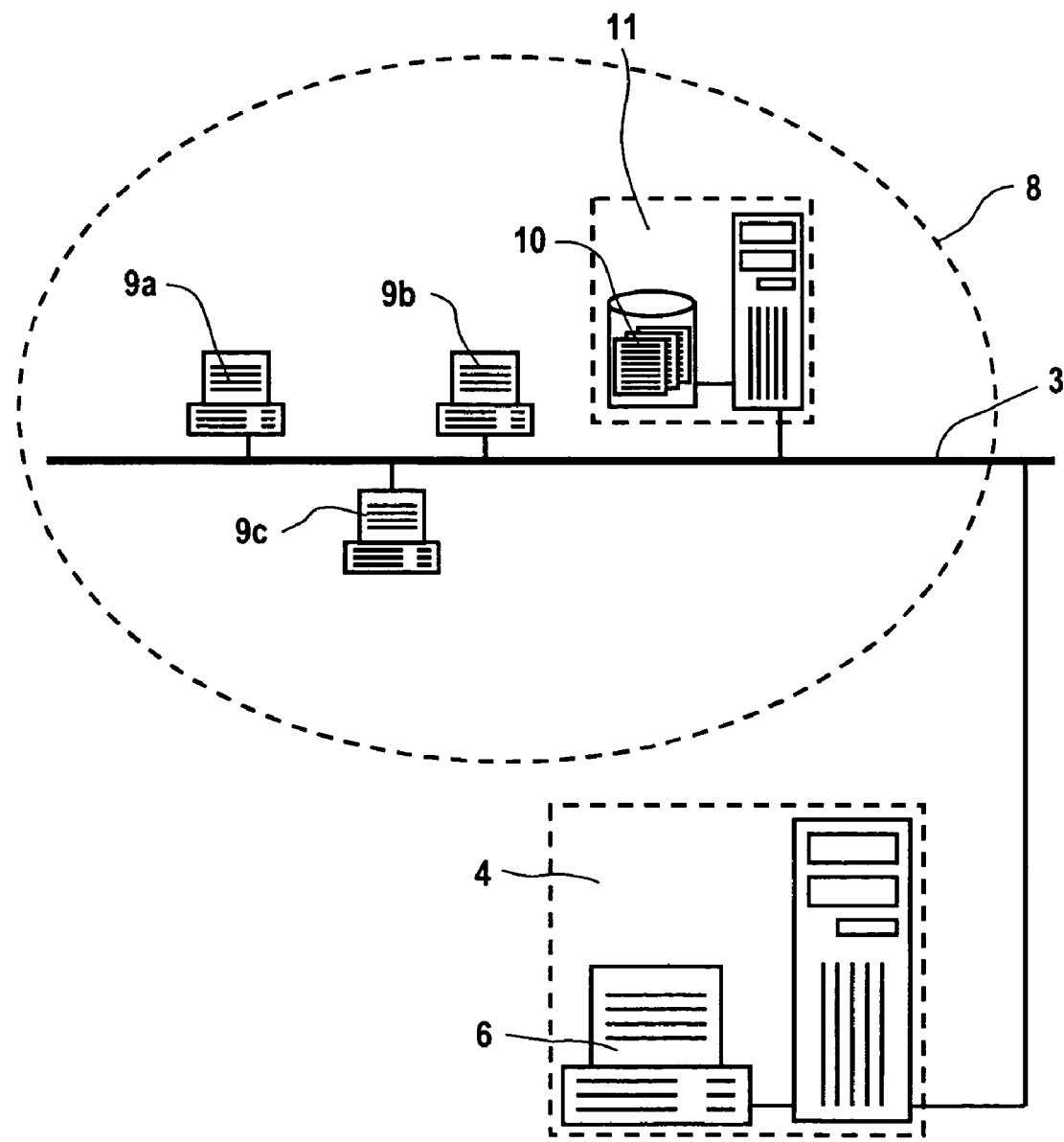
FIG. 2 shows group formation in an email system for interchanging electronic mail.

The method which the service 6 uses in order to combine users 9a, 9b, 9c of the e-mail system 8 shown in FIG. 2 to produce groups works in a similar manner to the method described for telecommunication networks. In this case, the group created is a distribution list, which can easily be used to notify all users 9a, 9b, 9c who are recorded with the same site in the user data records using an e-mail.

The e-mail system 8 uses a central subscriber database 10 which is stored on a central computer, the e-mail server 11. For each user 9a, 9b, 9c recorded in the e-mail system 8, this database 10 contains a subscriber data record in which the subscriber-specific data records have been stored. Each data record comprises a plurality of fields, including the field "name", the field "e-mail address", fields containing the address, telephone number and fax number and also a field containing the name of the user's site. For the purpose of grouping, the central service 6 installed on the central computer 4 uses an IP network 3, to which both the central service 6 and the e-mail server 11 are connected, to access the central database 10 in the e-mail system 8 and to interrogate the data records for all of the users 9a, 9b, 9c. The service user of the service 6 is now shown a list containing the names of all the fields which may be used in order to produce distribution lists. Following selection of an appropriate field—combinations of various fields are also possible—the service 6 now creates a list containing all of the different site names which arise in the total number of all of the data records. From this list, the service user now selects one, a plurality or else all of the sites for which a respective e-mail distribution list needs to be created. The service 6 now creates the corresponding list or the corresponding lists, with the service user being able to provide each list with a list name. It goes without saying that, particularly with a manageable number of sites, the service 6 can automatically select every site. In principle, use of the service 6 allows various presets according to which the service 6 either provides the service user with all formable groups for selection or creates all formable groups directly without a further check. The service 6 then accesses the email server 11 again and uses an appropriate administration command to generate new entries containing the list names of the new distribution lists in the address directory in the database 10 in the e-mail server 11. Using further commands, the central service 6 assigns these list names the e-mail addresses of those users 9a, 9b, 9c who need to be reached by addressing this list.

Figure 3:
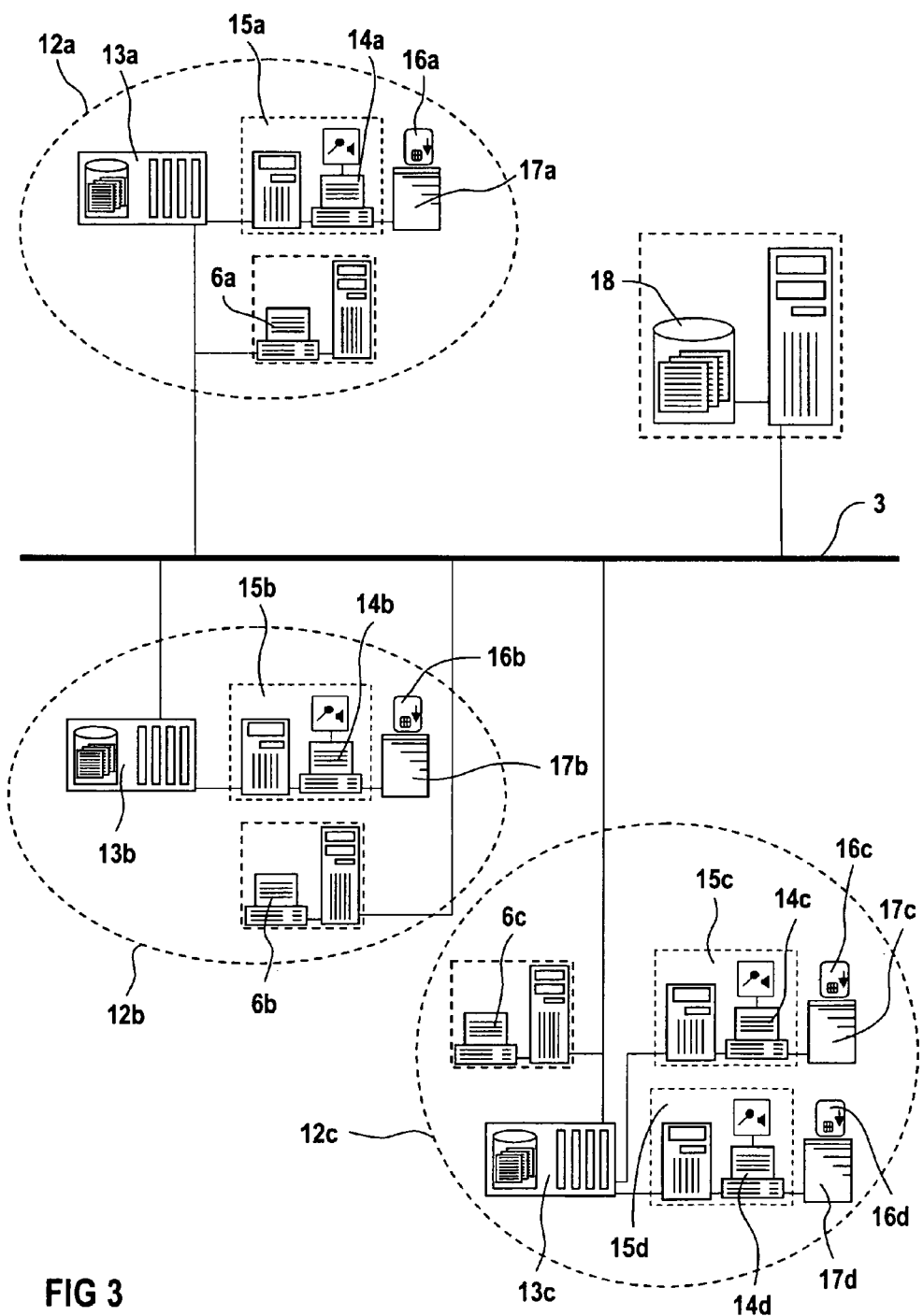
FIG. 3 shows registration of a subscriber using a smartcard and data maintenance in a communication network with already configured groups.

In the telecommunication network shown in FIG. 3 with various sites 12a, 12b, 12c, users are able to register flexibly at the various sites 12a, 12b, 12c on the respective communication systems 13a, 13b, 13c which are there. To use a telephony application 14a, 14b, 14c, 14d which is installed on a PC 15a, 15b, 15c, 15d with telephony capability, a smartcard 16a, 16b, 16c, 16d, that is to say a card equipped with a microchip, is inserted into a reader 17a, 17b, 17c, 17d which is connected to the appropriate PC 15a, 15b, 15c, 15d. An application program installed on this PC 15a, 15b, 15c, 15d reads the user's user number from the smartcard 16a, 16b, 16c, 16d, uses an IP network 3 to set up a connection to a user database 18 arranged centrally in the telecommunication network, and reads all of the user's subscriber-specific data records from this user database 18. The application program uses these subscriber-specific data records in order to register the user as a subscriber on the local communication system. Next, the application program starts the service 6a, 6b, 6c which is responsible for group formation for the subscribers on the local communication system, that is to say at the corresponding site. In this process, the service 6a, 6b, 6c is notified of the subscriber-specific data records for the newly registered subscriber. The service 6a, 6b, 6c now compares the subscriber-specific data records with those data which have been used to define already existing groups, that is to say call acceptance groups or e-mail distribution lists, for example. These groups are now updated and, if alterations arise, are administered afresh in all of the communication systems 13a, 13b, 13c affected.

The invention claimed is:

1. A method for forming groups of subscribers in a communication network, comprising;
   using data records associated with the subscribers, wherein the data records being available within the communication network and comprising predetermined identifiers for the subscribers, the predetermined identifiers being stored in fields in the data records;
   automatically checking selected fields in the data records for the same predetermined identifiers by a service;
   automatically combining the respective subscribers who have the same predetermined identifiers in the selected fields to produce a group corresponding to the same predetermined identifiers;
   automatically rechecking the association between the associated subscriber and one or more groups when a data record is changed; and
   implementing a fresh association if appropriate.

2. The method as claimed in claim 1, wherein the communication network is formed from a communication system or a plurality of communication systems.

3. The method as claimed in claim 1, wherein the data records are stored in a database.

4. The method as claimed in claim 3, wherein the association between subscribers and groups is automatically recorded in the database.

5. The method as claimed in claim 1, wherein the data records are created at least when the subscribers register for the first time.

6. The method as claimed in claim 1, wherein the subscribers who have been combined to produce a group may form a closed user group.

7. A method for forming groups of subscribe in a communication network, comprising:
   using data records associated with the subscribers, wherein the data records being available within the communication network and comprising identifiers for the subscribers, the identifiers being stored in fields in the data records;
   automatically checking selected fields in the data records for the same identifiers by a service;
   automatically combining the respective subscribers who have the same identifiers in the selected fields to produce a group;
   automatically rechecking the association between the associated subscriber and one or more groups when a data record is changed; and
   implementing a fresh association if appropriate,
   wherein subscribers who are temporarily unavailable are automatically removed from the group or groups for this time and are automatically added to the group or groups again when availability has returned.

8. The method as claimed in claim 1, wherein the subscribers who have been combined to produce a up have at least one common identifier in at least one field in the associated data records.

9. The method as claimed in claim 1, wherein the registration of a subscriber on a communication network for the purpose of creating the associated data record involves identifiers for individual or all fields in the data record being retrieved from a central database and being stored in the fields, and the subscriber being automatically associated with groups on the basis of these predetermined identifiers.

10. The method as claimed in claim 1, wherein the communication network is a packet-switched network or wherein a packet-switched network is used at least for the interchange of data.

11. The method as claimed in claim 1, wherein the communication network is a telecommunication network.

12. The method as claimed in claim 11, wherein the group comprises a call acceptance group.

13. The method as claimed in claim 1, wherein the communication network is a network for interchanging electronic mail.

14. The method as claimed in claim 13, wherein the group comprises a distribution list for electronic mail.

15. An apparatus for forming groups of subscribers in a communication network, comprising:
   data records associated with the subscribers, wherein the data records are available within the communication network and comprising predetermined identifiers for the subscribers, wherein the predetermined identifiers being stored in fields in the data records; and a computer having an installed service for automatically checking selected fields in the data records for the same et identifiers and for automatically combining those respective subscribers who have the same predetermined identifiers in the selected fields, to produce a group corresponding to the same predetermined identifiers, wherein the service being in a form such that when a data record is changed the service automatically rechecks the association between the associated subscriber and one or more groups and makes a fresh association if appropriate.

* * * * *